United States Patent [19]

Young

[11] 4,065,924
[45] Jan. 3, 1978

[54] METHOD OF LINING A WATERWAY OR RESERVOIR

[76] Inventor: Daniel Arthur Young, Blackgrove Farm, Tandridge Lane, Lingfield, Surrey, England

[21] Appl. No.: 587,626

[22] Filed: June 17, 1975

[30] Foreign Application Priority Data

June 20, 1974 United Kingdom ............ 27387/74

[51] Int. Cl.² ............................................. E02B 5/02
[52] U.S. Cl. .......................................... 61/7; 428/287; 428/474; 428/446
[58] Field of Search ............. 61/1 R, 36 D, 35, 7; 427/138; 428/287, 286, 520, 474, 489, 446; 156/71

[56] References Cited

U.S. PATENT DOCUMENTS

| | | | |
|---|---|---|---|
| 3,252,851 | 5/1966 | Bemon | 428/489 |
| 3,344,608 | 10/1967 | McBachran | 61/7 |
| 3,383,863 | 5/1968 | Berry | 61/7 |
| 3,415,022 | 12/1968 | Schaeffer et al. | 61/1 R |
| 3,547,674 | 12/1970 | Draper et al. | 428/489 |
| 3,555,828 | 1/1971 | Goldstein et al. | 61/7 |
| 3,753,938 | 8/1973 | Edwards et al. | 428/489 |
| 3,813,280 | 5/1974 | Olszyk et al. | 428/489 |
| 3,831,382 | 8/1974 | Califano et al. | 61/36 D |
| 3,864,157 | 2/1975 | Bresson et al. | 428/489 |
| 3,940,940 | 3/1976 | Barrett | 61/1 R |

*Primary Examiner*—Paul R. Gilliam
*Assistant Examiner*—Alex Grosz
*Attorney, Agent, or Firm*—McCormick, Paulding & Huber

[57] ABSTRACT

A method of preventing water from escaping through cracks in a waterway or reservoir includes the steps of forming a membrane of a laminate of butyl sheet with a layer of synthetic fibres bonded thereto, lining the waterway or reservoir with sheets of this membrane, sealing the joins between adjacent sheets and spraying high density concrete onto the exposed fibre layer.

7 Claims, 2 Drawing Figures

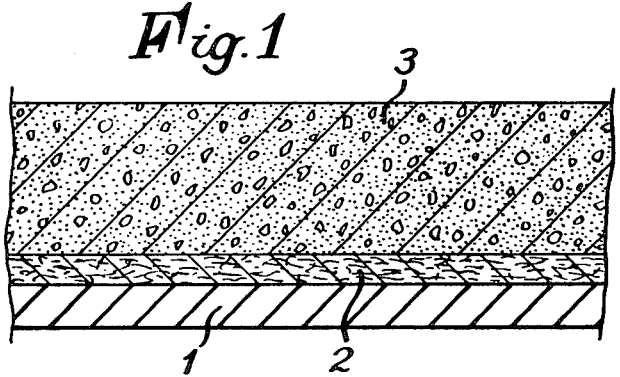
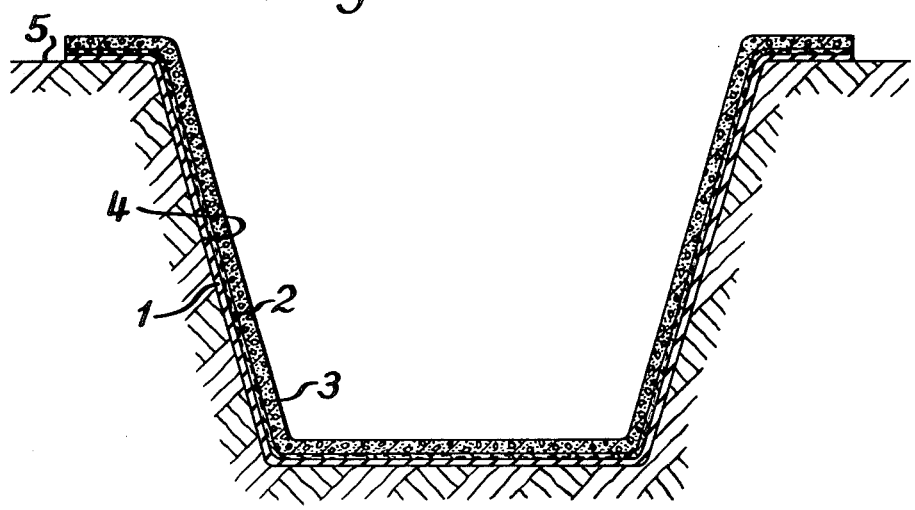

METHOD OF LINING A WATERWAY OR RESERVOIR

BACKGROUND OF THE INVENTION

This invention relates to a method of lining a waterway or reservoir and a laminate suitable for such purpose. In this Specification the word "Waterway" is intended to include rivers, canals and irrigation channels which are below ground level, and also aquaducts which are fabricated above ground level. Similarly, the word "reservoir" is intended to include water catchment areas which are below ground level, and also tanks and other water or other liquid containers which are fabricated above ground level.

There is a particular problem in fabricating irrigation channels in ensuring that the walls and base of the channel have a long life. The main existing method of fabricating such channels consists in excavating the channel out of the ground and then lining the walls and base of the channel with concrete. However, the surrounding ground may move over a period of time with the consequence that the concrete lining cracks and considerable leakage of water occurs. Movement and consequent cracking of the concrete may also occur due to ambient temperature fluctuations. New channels are lined either by precast concrete slabs which are joined together using a suitable filler or by casting the concrete in situ with the use of shuttering. In both of these previously practised methods the disadvantage results in that after some time the concrete cracks with loss of water from the channel.

It is the main object of this invention to provide a method of lining a waterway or reservoir which minimizes the above disadvantage.

SUMMARY OF THE INVENTION

According to the present invention there is provided a method of lining a waterway or reservoir which includes laminating a layer of a flexible and liquid impervious material with a layer of fibrous material, applying to the lamination to cover at least part of the surface of the waterway or reservoir with the fibrous material exposed, and applying to the exposed fibrous material a layer of a rigidly or semi-rigidly settable composition. Conveniently, the said steps are repeated successively and a join effected between adjacent lining sections.

The invention also includes a method of lining a waterway or reservoir which includes laminating a layer of a flexible and liquid impervious material with a layer of fibrous material, applying to the exposed surface of the fibrous material a layer of a rigidly or semi-rigidly settable composition and applying the resultant block to cover part of the surface of the waterway or reservoir, repeating the said steps successively, and effecting a join between adjacent blocks to form a continous lining for the waterway or reservoir.

The invention further includes a laminate for use in lining a waterway or reservoir which comprises a layer of a flexible and liquid impervious material with a layer of fibrous material on one surface thereof and a layer of a rigidly or semi-rigidly settable composition on the exposed surface of the fibrous material.

More specifically, the laminate may have its flexible and liquid impervious material of butyl, nitrile rubber, neoprene, ethylene propylene diene-monomer (EPDM), hyperlon, polyvinyl chloride, polyvinyl chloride nitrile or polyethylene or combinations thereof. The layer of fibrous material may be polyester fibre or polypropylene fibre or nylon fibre or a combination thereof. The rigidly or semi-rigidly settable composition may be cement, bitumen, asphalte, pitch or combinations thereof, either alone or with an epoxy resin as a binder.

One of the advantages which accrue with the use of a laminate in accordance with the present invention is that if after the passage of time the concrete lining of the waterway or reservoir cracks then liquid will not escape into the surrounding ground because the flexible liquid impervious underlayer forms a barrier.

BRIEF DESCRIPTION OF THE DRAWINGS

The invention will now be more particularly described by way of example only, and with reference to the accompanying drawing, in which:

FIG. 1 is a cross-sectional view through a laminate constructed in accordance with the invention; and FIG. 2 is a cross-sectional view through a waterway or reservoir when lined in accordance with the method of the invention with the laminate of FIG. 1.

DESCRIPTION OF THE PREFERRED EMBODIMENTS

As will be seen from FIG. 1 a laminate comprises a base layer 1 of a flexible and liquid, e.g. water, impervious material such as synthetic rubber, preferably butyl, which forms a waterproof membrane. Applied to one surface of this base layer 1 is a layer 2 of fibrous material, preferably polyester felt, and suitably 300 gram polyester felt is used. The base layer 1 may be conveniently 1 mm or 1.5 mm thick and the layer of felt 2 may be applied to the base layer 1 either by the use of an adhesive or by calendering the two layers together prior to the base layer 1 being vulcanized. The exposed surface of the felt layer 2 will present an array of fibres and form a key for the attachment of a third covering layer to be applied to the exposed surface of the felt layer 2. To this exposed surface of the felt layer 2 is applied a layer of a rigidly or semi-rigidly settable material, preferably a high density concrete, and this may be sprayed on with suitable spray equipment and then smoothed to minimize friction losses in flow through the waterway or reservoir. The cement is preferably applied by the GUNITE system of spraying using a coarse sand a strong cement mix of between 3 parts sand to 1 cement to 1 part sand to 1 part cement. The high density concrete penetrates the felt 2 and forms a strong key therewith. The high density concrete 3 will normally be of a thickness between ¼ inch to 2 inches and usually of a thickness of approximately ¾ inch. It will be appreciated however, that other methods of applying the high density concrete may be employed, for example, this may be applied by hand.

FIG. 2 shows how the laminate is applied to a waterway or reservoir. The waterway or reservoir is excavated to form the channel 4 and then preformed membrane units consisting of the base layer 1 and felt layer 2 are applied to the walls and base of the excavation with part of the membrane extending to ground level 5. Adjacent sections of membrane will have the butyl sheets slightly overlapping and these will be heat bonded together so as to form a continuous and water impervious layer. When the laminate is in position high density concrete 3 is sprayed by the GUNITE system of spraying on to the exposed surface of the felt and allowed to set.

This method of lining waterways or reservoirs can result in a longer lasting and more efficient liner, and enables the construction and lining of a channel to proceed at a comparable rate with conventional methods.

Alternatively, according to the invention, a three layer laminate is made prior to its application to the walls and base of the waterway or reservoir as prefabricated units. These units or blocks are then positioned and joined together by heat sealing of the underlayers and by the use of suitable infills to join adjacent runs of concrete.

Instead of using butyl or other synthetic rubber for th underlayer a plastics may be used and materials other than concrete, for example, bitumen may be used as the outer settable composition.

What we claim is:

1. A method of lining a waterway or reservoir, which method comprises the steps of laminating a layer of flexible and liquid impervious material with a layer of fibrous material to form a flexible base lamination, applying the lamination to cover at least part of the surface of the waterway or reservoir with the flexible and liquid impervious material adjacent the surface and the fibrous material situated on the side of the flexible and liquid impervious material opposite the surface, and applying to the fibrous material a thin exterior layer of high density concrete to form a key with the fibrous material underneath.

2. The method as claimed in claim 1, wherein said steps are repeated successively to form adjacent lining sections on adjacent surfaces of the waterway or reservoir and a further step comprises effecting a joint between the adjacent lining sections.

3. The method or lining a waterway or reservoir as claimed in claim 1 wherein the flexible and liquid impervious material is synthetic rubber, the fibrous material is polyester felt and the lamination is formed by calendering the felt and the synthetic rubber and then vulcanizing the rubber.

4. The method of lining a waterway or reservoir as claimed in claim 1 wherein the step of applying the layer of high density concrete comprises spraying the concrete onto the fibrous material to develop the key between the laminate and concrete.

5. The method of lining a waterway or reservoir as claimed in claim 4, further including the step of smoothing the exposed surface of the concrete prior to setting to minimize friction flow losses.

6. A method of lining a waterway or reservoir, which comprises laminating a layer of a flexible and liquid impervious material with a layer of fibrous material to generate a flexible lamination, then applying to the exposed surface of the fibrous material a thin layer of high density concrete in keyed relationship with the fibrous material to form a resultant block of lining, and applying the resultant block to cover part of the surface of the waterway or reservoir with the flexible and liquid impervious material against the surface of the waterway or reservoir, repeating the said steps successively and effecting a joint between adjacent blocks to form a continuous lining for the waterway or reservoir.

7. The method as claimed in claim 6, wherein the joint is in part effected by sealing adjacent layers of the flexible and liquid impervious material.

* * * * *